J. J. McDONALD.
TRAP.
APPLICATION FILED FEB. 4, 1909.
1,086,066.
Patented Feb. 3, 1914.
2 SHEETS—SHEET 1.
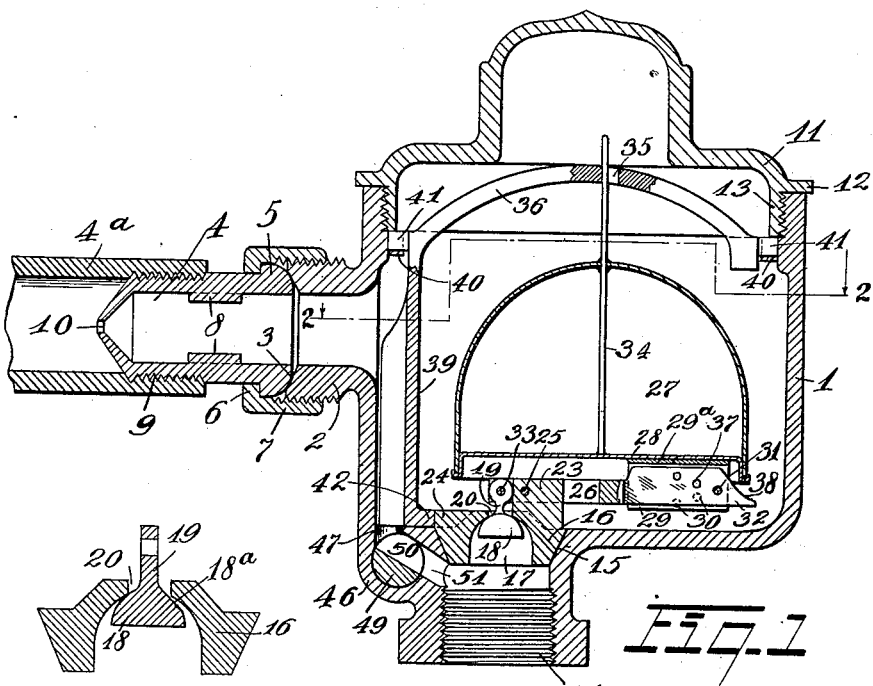
Fig. 1.
Fig. 6.
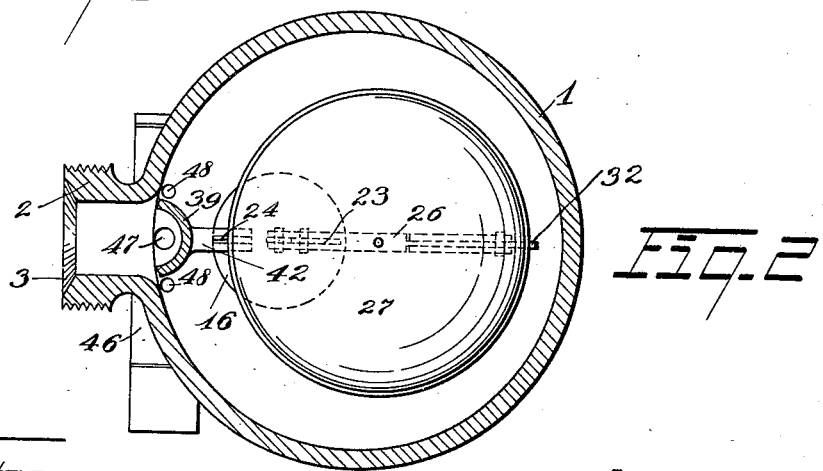
Fig. 2.
Witnesses:
Inventor.
James J. McDonald
By Bates, Fouts & Hull
Attys

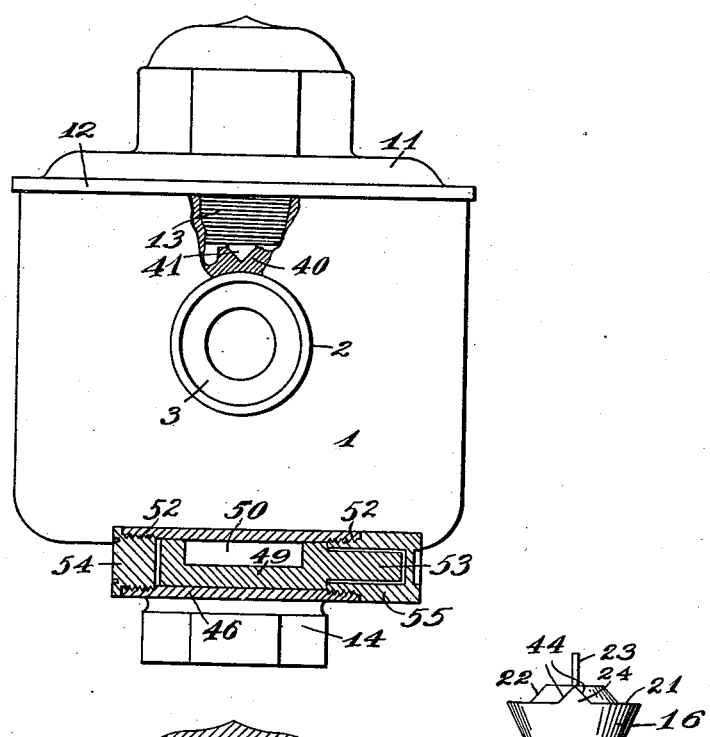

UNITED STATES PATENT OFFICE.

JAMES J. McDONALD, OF CLEVELAND, OHIO.

TRAP.

1,086,066.  Specification of Letters Patent.  Patented Feb. 3, 1914.

Application filed February 4, 1909. Serial No. 476,015.

*To all whom it may concern:*

Be it known that I, JAMES J. McDONALD, a citizen of the United States, residing at Cleveland, in the county of Cuyahoga and State of Ohio, have invented a certain new and useful Improvement in Traps, of which the following is a full, clear, and exact description, reference being had to the accompanying drawings.

This invention relates to traps, and more particularly to traps which are employed with the return lines of vacuum and pressure heating systems.

The objects of the invention are to provide a trap having an outlet valve through which water of condensation that may accumulate within the trap may be periodically discharged with a minimum liability of interference with the reliable action of the valve.

Further objects of the invention are to provide a trap of this character which may be readily adjusted to accommodate different conditions of pressure (positive or negative) that may exist in the system with which it is employed; to provide a trap of this character having a float with a convenient form of baffle which will prevent the impact of water of condensation or steam against the float, will protect the valve from the deposit of sediment thereon and will prevent dislodgment of the valve; to provide a trap of this character with an efficient and convenient form of by-pass by means of which water of condensation and sediment may be drawn from the trap independently of the aforesaid valve and its automatically operating float control; also to provide a trap having a connection which largely prevents the entrance of sediment into the trap.

Generally speaking, the invention may be defined as consisting of the combinations of elements embodied in the claims hereto annexed and illustrated in the drawings forming a part hereof, wherein—

Figure 1, represents a central sectional view taken through a trap constructed in accordance with my invention; Fig. 2 represents a sectional view corresponding to the line 2—2 of Fig. 1; Fig. 3 represents an elevation of the trap, the by-pass valve and casing being shown in section, the radiator connection being omitted and the casing being broken away to reveal the manner of securing the combined guide bridge and baffle in place; Fig. 4 a central vertical sectional view of the trap, the float, valve and lever being omitted; Fig. 5 a detail in elevation of the valve-seat fitting looking at right angles to the plane of Fig. 1; and Fig. 6 an enlarged sectional view of the valve and seat taken at an angle to Fig. 1.

Describing the parts by reference characters, 1 denotes the casing or body of the trap. This casing may be generally cylindrical in shape and is provided above the bottom thereof with a nipple 2, preferably cast therewith, said nipple being provided with an external thread and having its outer end beveled, as shown at 3, for the reception of the end of a connection 4. This connection is provided with a shoulder 5 adapted to be engaged by the inwardly projecting flange 6 of an internally threaded coupling 7, whereby the connection 4 may be clamped to the outer end of the nipple 2. The connection 4 is shown as provided with a pair of short inwardly projecting ribs 8 for the reception of a tool by means of which it may be screwed into a connection, as for instance the outlet connection $4^a$ of a radiator, the connection 4 being provided with an external screw thread 9 by means of which it may be threaded into such other connection. The end of connection 4 which is remote from the casing 1 is generally conical in shape and is provided with a central aperture 10, the purpose of which will be described hereinafter.

The casing 1 is provided at its upper end with a suitable cover 11, which is shown as provided with an outwardly projecting flange 12 adapted to engage the top of the casing 1 and being provided below such flange with a skirt 13 having an external screw thread adapted to fit in the internal thread at the top of the casing.

The bottom of the casing is provided with a connection 14, having its lower end provided with a thread for the reception of a pipe, which may be the return pipe of a vacuum or pressure heating system. The bottom of the casing merges with connection 14 by means of an inverted frusto-conical surface 15, which is adapted to receive a similarly tapered valve seat fitting 16. This fitting, as appears more particularly from Figs. 1 and 5, is provided with a recess 17 in the lower face thereof for the reception of the valve 18, said valve being provided with a stem 19 projecting upwardly through an aperture 20 in the top of the valve seat fitting. The upper peripheral portion 21 of the fitting 16 is substantially flush with the bottom of the casing 1. From the said peripheral portion, the fitting is inclined upwardly, as shown at 22, whereby the aperture 20 is elevated above the bottom of the casing 1. The fitting is provided with two oppositely arranged fins 23 and 24, the former projecting upwardly above the fitting a considerable distance and being provided with an aperture for the reception of a pin 25, which pin extends through a slot in a lever 26 and connects the same pivotally with said fin. The other fin 24 is for the purpose of providing an extended bearing for the lower end of the combined baffle and bridge, which will be described hereinafter.

27 denotes a float mounted within the casing 1. This float is of metal and is generally hemispherical in shape. It is conveniently formed of two pieces of sheet metal, the bottom piece 28 being provided with an upwardly extending recess. That portion of the bottom piece which is remote from the valve seat fitting is provided with a forked, downwardly projecting connecting member or yoke,—the forks 29 being connected at their upper ends by a plate 29ª, preferably integral therewith and soldered to the bottom of the float. The forks are provided with a plurality of apertures 30 therethrough for the reception of a pin 31 by means of which the yoke and the float of which it forms a part may be pivotally connected to the extension 32 of lever 26. The end of the lever which is opposite the extension 32 is pivotally connected with the valve stem 19 by means of a pin 33. The float is provided with a stem 34 secured to the bottom plate 28. The stem extends upwardly through the float and through a somewhat elongated slot 35 in the bridge 36, the stem forming a tight joint with the float body.

For convenience of description, that portion of the trap which is provided with the connection 2 will be referred to hereinafter as the "front" portion and the opposite portion as the "rear" portion, and corresponding terms will be employed to designate the location of the various parts of the trap.

It will be observed that the distance between pivots 25 and 33 on the front end of the lever 26 is very short when compared with the distance of the pivot 25 to any of the apertures 30 in the forks 29. It will also be observed, from an inspection of Figs. 1 and 5, that the valve 18 is rounded or hemispherical in shape and that its upper surface contacts with the valve seat in a line closely adjacent to the aperture 20, whereby a very small exposed surface of valve is presented to the action of the positive or negative pressure in the system. Owing to this fact and to the relatively great length of the rear arm of the lever as compared with the front arm, the float 27 will hold the valve 18 seated against a considerable positive pressure above the valve or a considerable negative pressure beneath the valve, dependent upon the relative lengths of the lever arms, the weight of the float and the exposed area of the valve. Attention has been directed to the provision of a plurality of apertures 30 in the forks 29. Similar apertures 37 are provided in the fin or extension 32. The apertures 30 and 37 are each arranged in a series which extends generally longitudinally of the forks and lever. This is for the purpose of accommodating the floats to different pressures in the system with which the traps may be employed, or to variations of pressure in different systems. It will be apparent that, by connecting the apertures 30 and 37 which are nearer the pivot of the lever, the float will be adapted for use with less pressure (positive or negative) than would be the case if the float and lever were connected at the point shown in the drawing.

In assembling the trap, it is desirable to insert the float, lever, valve and valve seat fitting in place in a connected condition. To facilitate the application of the fitting 16 to its seat, I extend the end of lever 26 beyond the bottom of the float, whereby said end may engage the float bottom and hold the lever and fitting in convenient position for inspection and for the application of the valve-seat fitting to the outlet connection 14. To prevent the end from engaging the float during the excursions of said float in the casing, due to the accumulation of water of condensation in the casing or to the action of the positive or negative pressure referred to, the rear end of the lever is beveled downwardly, as shown at 38, permitting a considerable range of movement of the float before its rear edge will engage said end. Furthermore, in order to preserve the proper proportion between the vertical movement of the float and the movement of the valve 18 and at the same time prevent the rear end of the lever extension 32 from engaging the float 27 during its upward movement, I arrange the apertures 30 and 37 in the manner shown in Fig. 1. That is to say, the apertures 30 extend downwardly from rear to front of the forks 29, while the apertures 37 extend upwardly from the rear to the front of the lever extension 32. In connecting the second apertures of the two series, it will be necessary to bring the float up or the lever down so that said apertures may register before inserting the pin 31. A similar relative movement is necessary in order to connect the third pair of apertures of the forks 29 and lever extension 32. By this arrangement, the throw of the float is proportioned to the throw of the forward end of lever 26, and at the same time the rear end of said lever is prevented from engaging the bottom of the float in all ordinary movements of said float and lever within in the casing.

Reference has been made to the bridge or guide 36. This bridge or guide is preferably formed integral with a baffle 39. The combined bridge and baffle will be conveniently retained in place by means of the construction shown in Figs. 1 and 3, by reference to which it will appear that the casing 1, immediately below the threaded upper end thereof is provided with a pair of oppositely located triangular seats 40 for the reception of corresponding triangular lugs 41 at opposite ends of the bridge 36. These lugs are so located as to be engaged by the lower end of the skirt 13 to retain the bridge and baffle in place. The baffle 39 extends across the connection 2 and down to the bottom of the casing 1, where it is provided with a rearwardly projecting lug or ridge 42 having a pair of inclined seats 43 therein adapted to engage corresponding inclined surfaces on the fin 24. The upper end of fin 24 may, if desired, project through a slot 45 formed in the upper portion of 42. From the construction described, it will be apparent that the lower end of the baffle has an elongated bearing on the valve seat fitting 16 whereby the weight and pressure exerted by the baffle upon the valve-seat fitting will be transmitted from the periphery to the center thereof. This prevents the tilting of the valve-seat fitting by the action of the float 27 and its associated parts on said fitting while permitting the easy removal of the said fitting when desired.

As will appear more clearly from Figs. 1, 2 and 4, the baffle 39 is curved, having its concave face presented toward the connection 2, and the opposite edges of said baffle are closely adjacent to the inner wall of the casing 1. It will also appear from Figs. 1 and 4 that at its upper end the baffle is reduced in width, beginning at a point slightly below the axis of the connection 2. The shape of this baffle prevents the direct impingement of water of condensation or steam upon the float 27 and also prevents any sediment that may enter through the connection 2 from being carried directly over to the valve seat fitting 16.

For the purpose of quickly removing any sediment that may accumulate within the trap, I provide a by-pass, said by-pass comprising a valve casing 46 having a valve therein and communicating with the bottom of the casing 1 and the outlet connection 14 below the valve-seat fitting 16. The casing is provided with three ports, namely; a central port 47 which extends through the bottom of the casing 1 and has its upper end within the lower curved end of baffle 39, and a pair of ports 48 located on each side of the lower end of the baffle 39 and extending through the bottom of the casing 1. The casing 46 may be conveniently cast with the casing 1 and has rotatably mounted therein a valve plug 49, said valve plug being provided with an elongated longitudinal port 50 adapted to register with the ports 47 and 48 and with a port 51 discharging into the connection 14 below the lower end of the fitting 16. The provision of the connection 4 with its central restricted aperture 10 largely prevents the entrance of sediment into the casing 1, as the bulk of the sediment will be trapped below said aperture between the conical end of the connection 4 and the subjacent portion of the radiator connection 4$^a$. Should any sediment pass into the trap, it will be largely retained within the baffle 39 and thus be prevented from gaining any access to that part of the casing containing the float and the valve seat fitting 16. Any sediment that may pass into the casing 1 and accumulate outside the baffle 39 may be withdrawn through the ports 48. The projection of the top of the fitting 16 above the bottom of the casing 1 practically eliminates any danger of sediment passing between the valve 18 and its seat. Should any sediment, however, enter the aperture 20, it will not remain on the valve 18, as this valve is self-cleaning, the water of condensation or steam which flows over the upper surface thereof effectually removing sediment that may accumlate thereon. As a further precaution, while the valve stem 19 is made sufficiently smaller than the aperture 20 to provide a free space around said stem, said space, however, is of no greater diameter than the opening which exists between the valve 18 and its seat when the float 27 is elevated by the accumulation of water of condensation in the casing 1 or by the action of the positive or negative pressure in the system acting upon the top or bottom of the valve.

From the above description it will be apparent that I have provided a trap which will collect water, which will automatically discharge the same at intervals and which may be adjusted to suit various conditions of pressure in the system with which it may be employed. It will also be apparent that it will reduce to a minimum the liability of any imperfect operation due to the accumulation of sediment and that, should any such sediment accumulate within the body of the trap it may be conveniently removed. It will also appear that the float 27 is capable of operating as a float to permit water of condensation to escape as well as a weight whereby the degree of positive or negative pressure at which the valve 18 will open may be controlled. The weight of the float will hold the valve closed until water of condensation reaches a predetermined level or until the positive pressure above, or the negative pressure below, the valve opens the same.

As will appear from Fig. 3, the valve plug 49 rotates within a space provided between the threaded ends 52 of the casing and is provided with an operating stem 53 of less diameter than its body. One end of the casing will be closed by a solid plug 54, while the other end will be closed by a hollow plug 55 inclosing the end of plug 53. By this construction the valve plug 49 is reversible and may be operated by its stem from either the right or left hand side of the trap, as may be desirable. This is a circumstance of great advantage in applying the trap to various types of heating systems.

By reference to Fig. 6, it will be seen that a capillary passage is provided between the valve 18 and its seat 16. This passage is for the purpose of permitting the escape of air when steam is turned onto the system, also water of condensation which may accumulate, especially the water remaining in the trap after steam has been cut off from the system or from the part thereof with which the trap may be employed. When steam is on, the float will lift from time to time, and discharge the water of condensation in the manner hereinbefore described. This capillary passage may be conveniently formed by removing a small area of the surface of the valve 18 on the line at which it engages the seat 16, thus providing the port or passage 18ª, shown in Fig. 6.

I claim:

1. In a device of the character set forth, the combination of a casing having an inlet connection and provided with an outlet connection in the bottom thereof having at its upper end an outwardly flaring seat, a valve-seat fitting provided with a complementarily flared surface engaging the flared seat of the outlet connection and having an upwardly extending valve seat and an aperture communicating with said seat and extending through the top of said seat, a valve in said seat having a stem extending through said aperture, an operating device in said casing and a lever connecting said device and said valve stem.

2. In a device of the character set forth, the combination of a casing having an inlet and provided in its bottom with an outlet, a valve-seat fitting resting in said outlet, an upwardly-seating valve coöperating with said fitting, a float, a lever connecting said float and said valve, and a baffle interposed between said inlet and said valve and engaging the valve fitting.

3. In a device of the character set forth, the combination of a casing having an inlet and provided in its bottom with an outlet, a valve-seat fitting resting in said outlet, an upwardly seating valve coöperating with said fitting, a float, a lever connecting the float and valve, a guide stem for said float, and a bridge having a guide opening for said stem, said bridge having an extension engaging said fitting.

4. In a device of the character set forth, the combination of a casing having an inlet and an outlet, a valve controlling said outlet, a float operatively connected with said valve, a guide for said float extending across the casing and resting in seats below the top thereof, a baffle carried by said guide between said inlet and said float and a cover for said casing adapted to engage said guide above said seats.

5. In a device of the character set forth, the combination of a casing having an inlet and a bottom outlet, a valve-seat fitting resting in said outlet, a valve in said fitting, a lever pivoted to said fitting at one side thereof and connected to said valve, a float connected to said lever, and a baffle interposed between the inlet and the outlet and engaging the side of said fitting opposite the lever pivot.

6. In a device of the character set forth, the combination of a casing having an inlet and a bottom outlet, a valve seat fitting in said outlet and having upwardly extending members on opposite sides thereof, a valve coöperating with said fitting, a float, a lever pivoted to one of said members and connected at opposite ends to said valve and float respectively, and a baffle interposed between the inlet and the fitting and having a projection engaging the other member of the fitting.

7. In a device of the character set forth, the combination of a casing having an inlet and an outlet, a valve controlling said outlet, a float having a connecting member on its under side between the center and periphery thereof, said member having a series of apertures therein, a lever connected to said valve and having a series of apertures corresponding to the apertures in said member, and means adapted to extend through the apertures of the connecting member and lever.

8. In a device of the character set forth, the combination of a casing having an inlet and a valve controlled outlet, a by-pass connection between the casing and the outlet, said connection comprising a valve casing having its opposite ends threaded, a rotary reversible valve in said valve casing having a stem, and interchangeable plugs for the ends of said valve casing.

9. In a device of the character set forth, the combination of a casing having a side inlet and a valve-controlled bottom outlet, a curved baffle extending from the inlet to the bottom of the casing and having its sides in close proximity to the side of the casing, a post in the bottom of the casing within the space included between the baffle and the casing wall, a port in the bottom of the casing on each side of said baffle, a by-pass connection between the casing and the valve controlled outlet, said connection being provided with a valve having a chamber adapted to communicate with all of said ports.

10. In a device of the character set forth, the combination of a casing having an inlet and a bottom outlet, a valve seat fitting resting in said outlet and having a portion of its top formed to receive a retaining member, a valve therefor, a float, a lever connected to said float and said valve, and a baffle interposed between the inlet and the outlet and having a rearwardly projecting retaining member having a seat adapted to engage a corresponding portion of the valve seat fitting.

11. In a device of the character set forth, the combination of a casing having an inlet and an outlet, a valve controlling the outlet, a float in said casing having a connecting member projecting from the bottom thereof, and a lever connected to said valve and to said member and having a beveled end adapted to engage the lower edge of the float.

12. In a device of the character set forth, the combination of a casing having a substantially cylindrical side wall and having an outlet in the bottom thereof, a valve controlling said outlet, a float in said casing operatively connected with said valve, said casing having an inlet in the side wall above the bottom thereof, and a vertically extending baffle plate located adjacent to the inlet, said baffle plate being transversely curved and having its edges in substantial engagement with the casing wall on opposite sides of the inlet and extending from the bottom of said casing substantially as high as the central portion of the inlet connection.

13. In a device of the character set forth, the combination of a casing having an outlet in the bottom thereof, a valve controlling said outlet, a float in said casing operatively connected with said valve, said casing having an inlet in the wall above the bottom thereof, and a vertically extending baffle plate located adjacent to the inlet, said baffle plate having its edges in substantial engagement with the casing wall on opposite sides of the inlet and extending from the bottom of said casing above the bottom of the inlet connection.

14. In a device of the character set forth, the combination of a casing having an outlet in the bottom thereof, a valve for said outlet, a float operatively connected with said valve, the wall of the casing being provided with an inlet connection above the bottom of the casing, and a vertically arranged baffle plate extending upwardly from the bottom of the casing as far as the inlet connection and forming a passageway therewith, said baffle plate being reduced in width opposite the upper part of said connection.

15. In a device of the character set forth, the combination of a casing having an outlet on the bottom thereof, a valve controlling said outlet, a float connected to said valve, said casing being provided with an inlet connection located above the bottom thereof, a baffle plate interposed between the inlet connection and the float, said baffle plate extending upwardly from the bottom of the casing to a point above the bottom of the inlet connection and being reduced above such point and forming with the casing a vertical passageway extending upwardly as high as the bottom of the inlet connection.

16. In a device of the character set forth, the combination of a casing having a side inlet and a bottom outlet, a valve for said outlet comprising a vertically removable valve seat resting in the outlet, a valve having a stem projecting upwardly through said seat, a float, means operatively connecting said float and said valve, and a baffle plate interposed between the inlet connection and the float and having its lower end engaging the valve seat.

17. In a device of the character set forth, the combination of a casing having an inlet and an outlet, a valve for said outlet, a float operatively connected to said valve, a baffle in the casing interposed between the inlet and the outlet and extending to the bottom of the casing, and a valve-controlled by-pass communicating at one end with the outlet and at its opposite end with the space between the baffle and the adjacent wall of the casing.

18. In a device of the character set forth, the combination of a casing having an inlet and a valve controlled outlet, a baffle in the casing interposed between the inlet and the outlet, a valve-controlled by-pass connection communicating with the outlet and with the space between the baffle and the adjacent wall of the casing, and a port located outside of the space formed between the baffle and the casing and communicating with the by-pass connection.

19. In a device of the character set forth, the combination of a casing having an inlet and an outlet, a valve controlling said outlet, a float having a connecting member on its under side located between the center and periphery of the float, said member having a longitudinal series of apertures therein, a lever connected to said valve and having a longitudinal series of apertures corresponding to the apertures in said connecting member, and means adapted to extend through the apertures of the connecting member and lever.

20. In a device of the character set forth, the combination of a casing having an inlet and an outlet, a valve controlling said outlet, a float having a connecting member on its under side, said member having a longitudinal series of apertures therein, a lever connected to said valve and having a longitudinal series of apertures corresponding to the apertures in said connecting member, and means adapted to extend through the apertures of the connecting member and lever.

21. In a device of the character set forth, the combination of a casing having an inlet and provided with an outlet near the bottom thereof, a vertically reciprocable valve for said outlet, a float in said casing having on its bottom a connecting member between the center and the periphery thereof, said member having a longitudinal series of apertures, a lever having one end connected to said valve and having its opposite end provided with a longitudinal series of apertures corresponding to those of the connecting member, and means for connecting the apertures of the lever with those of the member.

22. In a device of the character set forth, the combination of a casing having an inlet and a bottom outlet, a valve-seat fitting resting in said outlet and having an aperture therethrough, a valve adapted to seat upwardly and having a stem projecting through said aperture, said fitting being provided with a lever support, a lever connected to the valve stem and pivoted to said support, an operating device in the casing connected to said lever, a bridge extending across the casing and having an operative connection with said device, and means projecting from the bridge and adapted to bear against the valve seat fitting on the side opposite the lever support.

23. In a device of the character set forth, the combination of a casing having an inlet and a bottom outlet, a valve-seat fitting resting in the outlet and having an aperture therethrough, an upwardly seating valve having a stem projecting through said aperture, a lever support carried by said fitting, a lever pivoted to said support and connected to said valve stem, an operating device within the casing connected to said lever, and means within the casing adapted to engage the valve-seat fitting on the side opposite the lever support.

In testimony whereof, I hereunto affix my signature in the presence of two witnesses.

JAMES J. McDONALD.

Witnesses:
J. B. HULL,
BRENNAN B. WEST.

Copies of this patent may be obtained for five cents each, by addressing the "Commissioner of Patents, Washington, D. C."